United States Patent
Wu et al.

(10) Patent No.: US 11,714,454 B1
(45) Date of Patent: Aug. 1, 2023

(54) HEAD-MOUNTED DISPLAY DEVICE AND WEARABLE ASSEMBLY

(71) Applicant: HTC Corporation, Taoyuan (TW)

(72) Inventors: Chou-Wei Wu, Taoyuan (TW); Chun-Wei Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/586,785

(22) Filed: Jan. 28, 2022

(51) Int. Cl.
 *G06F 1/16* (2006.01)

(52) U.S. Cl.
 CPC .................................. *G06F 1/163* (2013.01)

(58) Field of Classification Search
 CPC ....................................................... G06F 1/163
 See application file for complete search history.

(56) References Cited

U.S. PATENT DOCUMENTS

| | | | |
|---|---|---|---|
| 10,375,464 B2 | 8/2019 | Wang et al. | |
| 2018/0338130 A1* | 11/2018 | Miller | H04N 13/327 |
| 2018/0364490 A1* | 12/2018 | Lin | G02B 27/0176 |
| 2019/0196536 A1* | 6/2019 | Wang | G06F 3/011 |
| 2020/0310488 A1 | 10/2020 | Lin et al. | |
| 2023/0004013 A1* | 1/2023 | McCracken | G02B 27/0172 |

FOREIGN PATENT DOCUMENTS

| | | |
|---|---|---|
| CN | 106405861 | 2/2017 |
| CN | 205982844 | 2/2017 |
| CN | 210129071 | 3/2020 |
| TW | M599915 | 8/2020 |
| WO | 2016136657 | 9/2016 |

OTHER PUBLICATIONS

"Office Action of Taiwan Counterpart Application", dated Jan. 31, 2023, p. 1-p. 5.

* cited by examiner

*Primary Examiner* — James Wu
(74) *Attorney, Agent, or Firm* — JCIPRNET

(57) ABSTRACT

A head-mounted display device, including a front assembly and a wearable assembly, is provided. The wearable assembly is connected to the front assembly and is adapted for wearing the front assembly to a user's face. The wearable assembly includes a cradle, a coupling mechanism, multiple side headbands, a button, and a position returning member. When the button is pressed relative to the cradle, the button drives the coupling mechanism not to be coupled to the side headbands, so that the side headbands can move freely relative to the cradle to adjust the distance between the cradle and the front assembly. When the button is released relative to the cradle, the position returning member drives the coupling mechanism to be coupled to the side headbands, and tighten the side headbands relative to the cradle through the coupling mechanism.

16 Claims, 15 Drawing Sheets

HEAD-MOUNTED DISPLAY DEVICE AND WEARABLE ASSEMBLY

BACKGROUND

Technical Field

The disclosure relates to a display device, and more particularly to a head-mounted display device and a wearable assembly.

Description of Related Art

With the increasing development of the technology industry, the types, functions, and ways of use of display devices are becoming more and more diverse, and head-mounted display devices that can be directly worn on a user's body are also born accordingly. There are quite a few types of head-mounted display devices. Taking head-mounted display devices such as goggles as an example, after wearing such a display device, in addition to seeing stereoscopic images, the images will further change as the user's head turns, providing a more immersive experience for the user.

The front assembly of the head-mounted display device is worn on the user's face through the wearable assembly so that the display module of the front assembly may project a display image toward the user's eyes. Since the size of each user's head is different, the wearable assembly needs to be adjusted when the head-mounted display device is worn on the head. Therefore, how to quickly and conveniently adjust the wearable assembly is an important development at present.

SUMMARY

The disclosure provides a head-mounted display device, and the wearing size of the head-mounted display device may be adjusted quickly and conveniently.

The disclosure provides a wearing assembly capable of quickly and conveniently adjusting the wearing size of a head-mounted display device.

The head-mounted display device of the disclosure includes a front assembly and a wearable assembly. The wearable assembly is connected to the front assembly and is adapted for wearing the front assembly to a user's face. The wearable assembly includes a cradle, a coupling mechanism, multiple side headbands, a button, and a position returning member. The coupling mechanism is disposed in the cradle. The side headbands individually connect to the front assembly and insert into the cradle. The button movably is connected to the cradle and is coupled to the coupling mechanism. The position returning member is disposed between the cradle and the coupling mechanism. When the button is pressed relative to the cradle, the button drives the coupling mechanism not to be coupled to the side headbands, so that the side headbands can move freely relative to the cradle to adjust the distance between the cradle and the front assembly. When the button is released relative to the cradle, the position returning member drives the coupling mechanism to be coupled to the side headbands, and tighten the side headbands relative to the cradle through the coupling mechanism.

The wearable assembly of the disclosure is adapted to be connected to a front assembly of a head-mounted display device and is adapted for wearing the front assembly to a user's face. The wearable assembly includes a cradle, a coupling mechanism, multiple side headbands, a button, and a position returning member. The coupling mechanism is disposed in the cradle. The side headbands individually connect to the front assembly and insert into the cradle. The button movably is connected to the cradle and is coupled to the coupling mechanism. The position returning member is disposed between the cradle and the coupling mechanism. When the button is pressed relative to the cradle, the button drives the coupling mechanism not to be coupled to the side headbands, so that the side headbands can move freely relative to the cradle to adjust the distance between the cradle and the front assembly. When the button is released relative to the cradle, the position returning member drives the coupling mechanism to be coupled to the side headbands, and tighten the side headbands relative to the cradle through the coupling mechanism.

Based on the above, in the disclosure, the head-mounted display device drives the coupling mechanism by pressing the button, so that the side headbands have a degree of freedom to move relative to the cradle, and then the distance between the cradle and the front assembly is adjusted so as to allow a user to quickly and conveniently adjust the wearing size of the head-mounted display device. In addition, when the button is released, the position returning member may tighten the side headbands through the coupling mechanism to continuously and slightly reduce the distance between the cradle and the front assembly, so that the head-mounted display device can further continuously get close to the user's head.

DESCRIPTION OF THE EMBODIMENTS

Figure 1A:
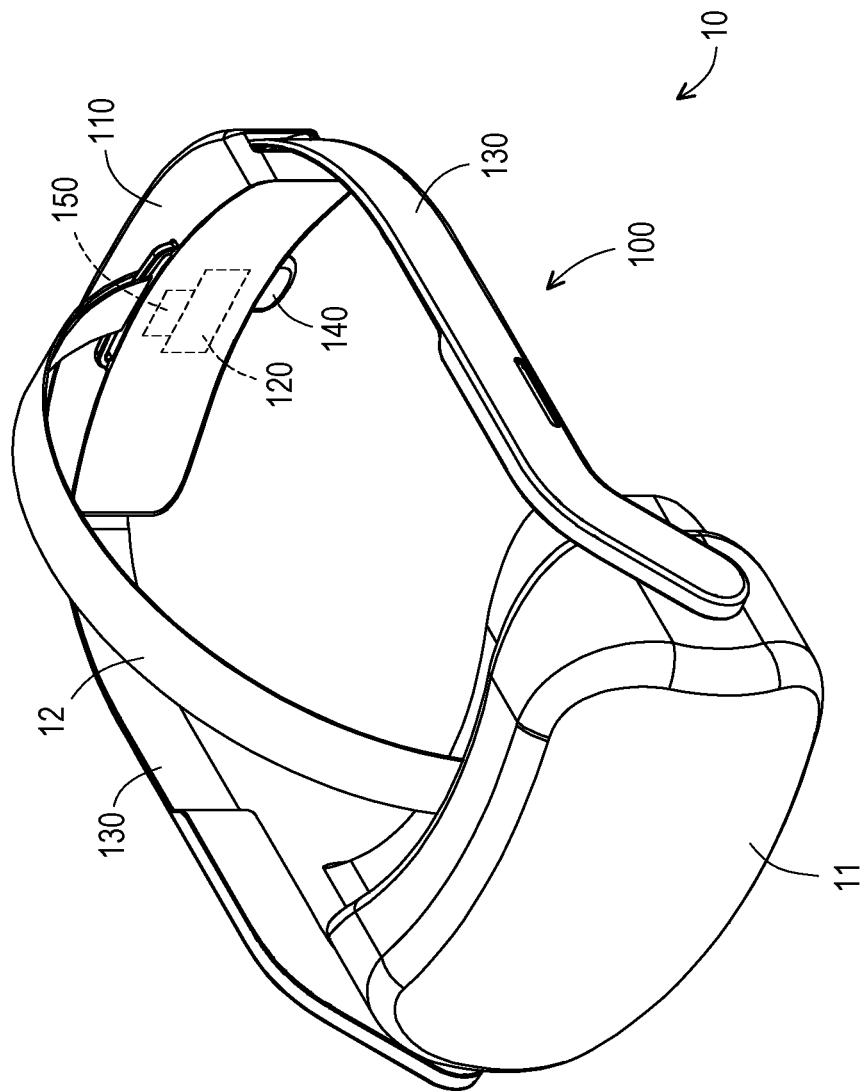
FIG. 1A is a schematic diagram of a head-mounted display device according to an embodiment of the invention.
Figure 1B:
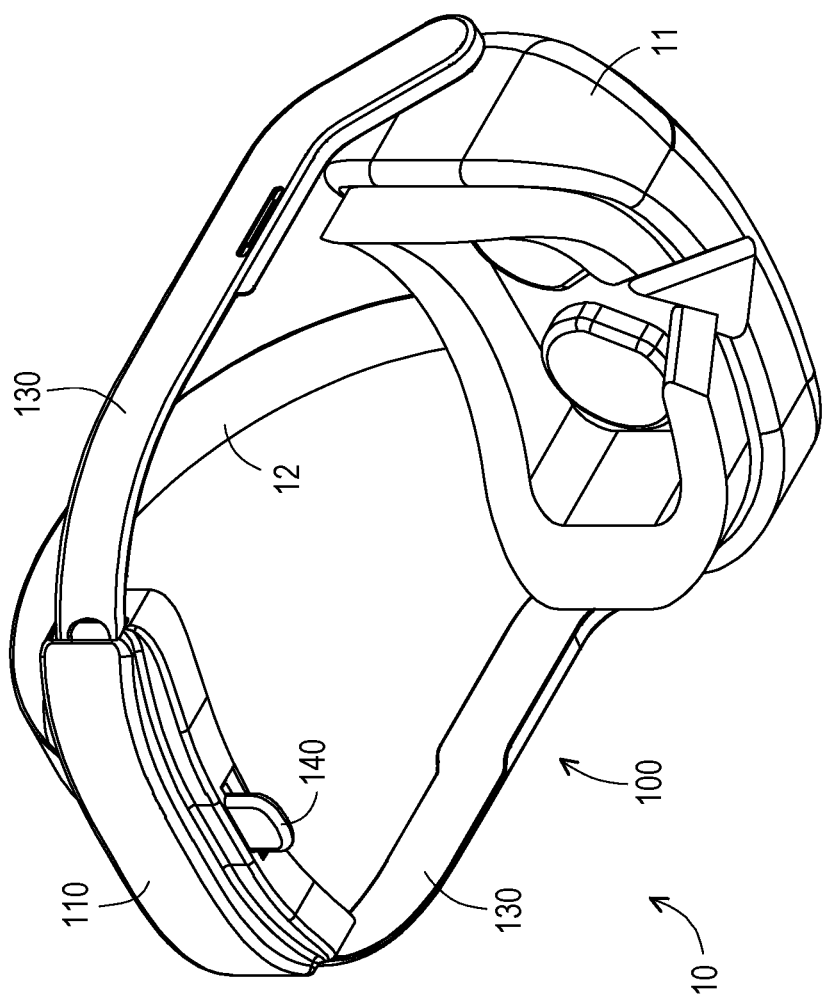
FIG. 1B is a schematic diagram of the head-mounted display device of FIG. 1A from another viewing angle.

Referring to FIGS. 1A and 1B, in the embodiment, a head-mounted display device 10 includes a front assembly 11 and a wearable assembly 100. The wearable assembly 100 includes a cradle 110, a coupling mechanism 120, multiple side headbands 130, a button 140, and a position returning member 150. The coupling mechanism 120 is disposed in the cradle 110. The wearable assembly 100 uses the side headbands 130 to connect to the front assembly 11, and the side headbands 130 insert into the cradle 110. The button 140 is movably connected to the cradle 110 and is coupled to the coupling mechanism 120. The position returning member 150 is disposed between the cradle 110 and the coupling mechanism 120. When the button 140 is pressed relative to the cradle 110, the button 140 drives the coupling mechanism 120 not to be coupled to the side headbands 130, so that the side headbands 130 can move freely relative to the cradle 110 to adjust the distance between the cradle 110 and the front assembly 11. When the button 140 is released relative to the cradle 110, the position returning member 150 drives the coupling mechanism 120 to be coupled to the side headbands 130, and tighten the side headbands 130 relative to the cradle 110 through the coupling mechanism 120.

In the embodiment, the front assembly 11 may include components such as an optical system (not shown) and a protective casing, and may be disposed with a display or be adapted for placing a display. The aforementioned display may be a built-in display or an external portable display (such as a smart phone, etc.), but the disclosure is not limited thereto. The types of the aforementioned displays may be adjusted according to the application of the head-mounted display device 10 in a virtual reality system, an augmented reality system, or a mixed reality system. The optical system includes optical elements used to change the optical path of the display, such as lenses, light guides, or prisms.

Moreover, in the embodiment, the head-mounted display device 10 may further include an auxiliary headband 12. The auxiliary headband 12 connects the front assembly 11 and the wearable assembly 100, and the side headbands 130 and the auxiliary headband 12 are adapted for wearing the front assembly 11 to a user's head.

Figure 2A:
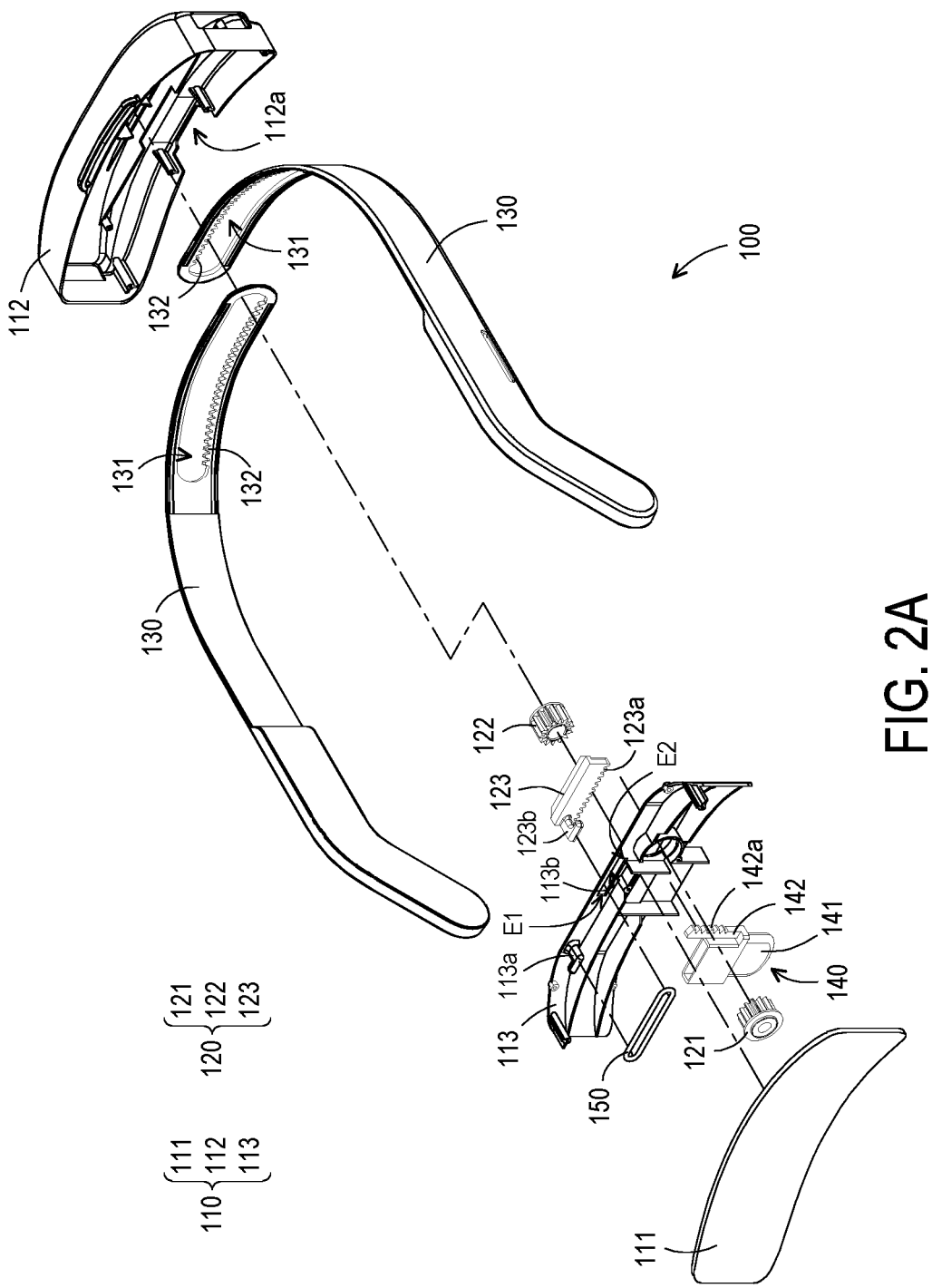
FIG. 2A is an exploded view of the head-mounted display device of FIG. 1A.
Figure 2B:
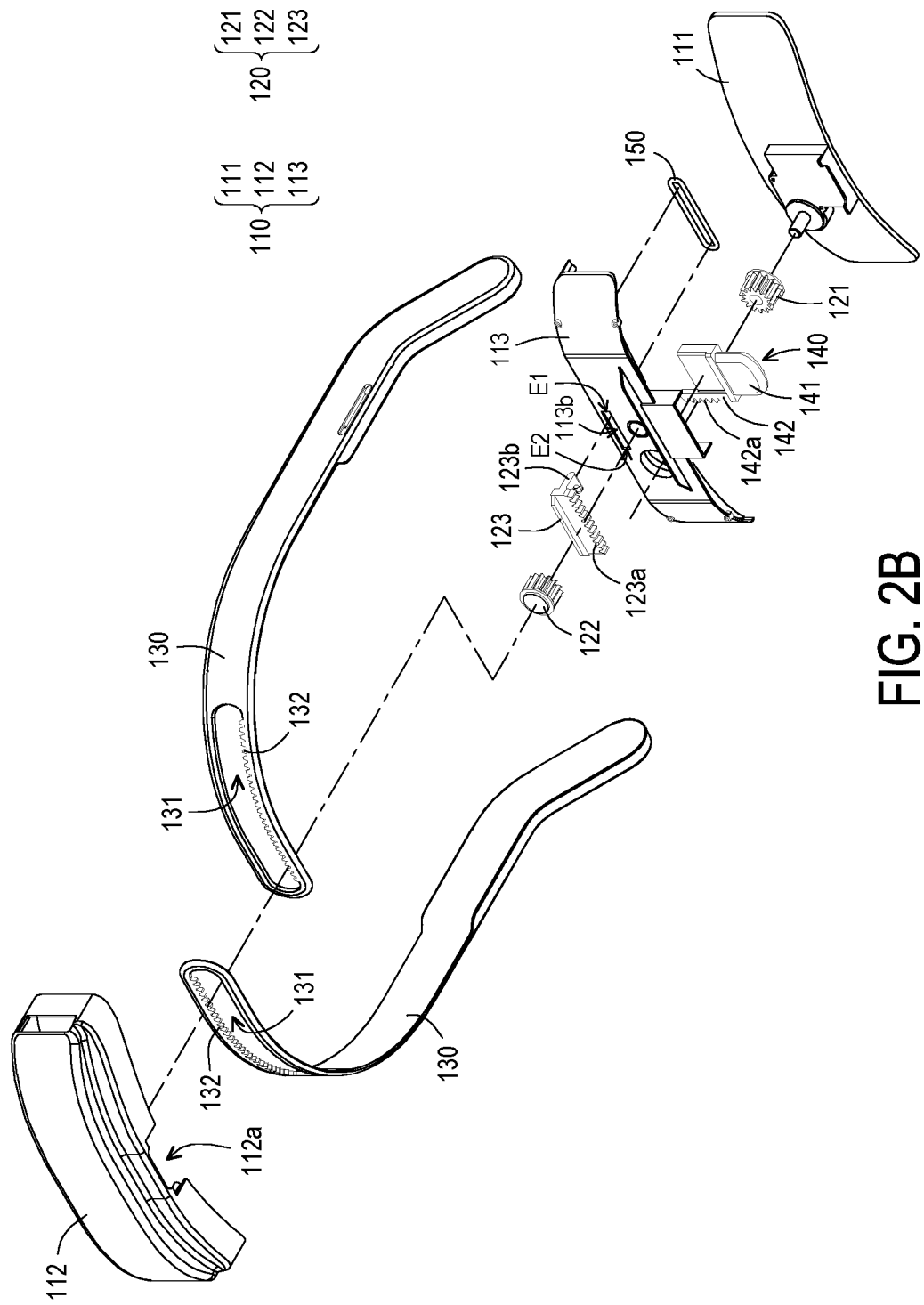
FIG. 2B is an exploded view of the head-mounted display device of FIG. 1B.

Referring to FIGS. 2A and 2B, the coupling mechanism 120 may include a first rotating member 121, a second rotating member 122, and a moving member 123. The first rotating member 121 is rotatably connected to the cradle 110 and is coupled to the moving member 123 and the button 140. The second rotating member 122 is rotatably connected to the cradle 110 and is coupled to the moving member 123 and the side headbands 130. The moving member 123 is movably connected to the cradle 110. Specifically, when the button 140 is pressed relative to the cradle 110 to drive the first rotating member 121 to rotate, the first rotating member 121 drives the moving member 123 to move and separate from the second rotating member 122, so that the side headbands 130 can move freely relative to the cradle 110 to adjust the length of each of the side headbands 130 exposed from the cradle 110.

In the embodiment, the cradle 110 may include a front cover 111, a rear cover 112, and a frame body 113. The frame body 113 is disposed between the front cover 111 and the rear cover 112, and the rear cover 112 may have an opening 112a. The button 140 is movably disposed in the cradle 110 and protrudes from the opening 112a. The button 140 may include a pressing portion 141 and a coupling portion 142. The pressing portion 141 extends outside the opening 112a. The coupling portion 142 extends into the cradle 110 from the pressing portion 141 and is coupled to the first rotating member 121. The first rotating member 121 inserts into the frame body 113 and is pivotally connected to the front cover 111, so that the first rotating member 121 may rotate relative to the frame body 113. The second rotating member 122 is disposed between the rear cover 112 and the frame body 113 and is pivotally connected to the rear cover 112, so that the second rotating member 122 may rotate relative to the frame body 113. The second rotating member 122 is further coupled to the side headbands 130. When the second rotating member 122 rotates relative to the frame body 113, the rotation of the second rotating member 122 drives the side headbands 130 to move relative to the cradle 110, thereby changing the lengths of the side headbands 130 exposed from the cradle 110.

In the embodiment, the first rotating member 121 and the second rotating member 122 are gears, and the moving member 123 may include a moving rack portion 123a. The first rotating member 121 and the second rotating member 122 engage with the moving rack portion 123a, respectively.

The coupling portion 142 of the button 140 may have a button rack portion 142a, and the button rack portion 142a engages with the first rotating member 121. The moving member 123 may further have a moving hook portion 123b disposed on a side close to the second rotating member 122. The frame body 113 of the cradle 110 may further have a cradle hook portion 113a and a cradle slot 113b. The moving member 123 is disposed on one side of the cradle slot 113b. The moving hook portion 123b protrudes from the cradle slot 113b and may move in the cradle slot 113b. Both ends of the position returning member 150 are hooked by the moving hook portion 123b and the cradle hook portion 113a, respectively, and the position returning member 150 provides a restoring force to the moving member 123 to move the moving hook portion 123b toward the direction of the cradle hook portion 113a. In the embodiment, the position returning member 150 may be an elastic spring ring or a magnetic magnet set, so as to provide a restoring force for the moving member 123 to move the moving member 123 toward the direction of the cradle hook portion 113a, but is not limited thereto.

In the embodiment, the cradle slot 113b may have a first end E1 and a second end E2. The first end E1 is close to the second rotating member 122 and the cradle hook portion 113a, and the second end E2 is close to the first rotating member 121. When the position returning member 150 connects the moving hook portion 123b and the cradle hook portion 113a, the position returning member 150 exerts a restoring force to the moving member 123 so that the moving member 123 abuts against the position of the first end E1. When the moving member 123 receives an external force opposite to the direction of the restoring force and greater than the restoring force, the moving member 123 moves to the position of the second end E2.

In the embodiment, the side headbands 130 may each have a headband slot 131 and a headband rack portion 132. The second rotating member 122 inserts into the headband slots 131 and engages with the headband rack portions 132. When the side headbands 130 move toward each other, the lengths of the side headbands 130 exposed from the cradle 110 is shortened, so that the distance between the front assembly 11 and the cradle 110 is shortened. When the side headbands 130 move away from each other, the lengths of the side headbands 130 exposed from the cradle 110 is lengthened, so that the distance between the front assembly 11 and the cradle 110 is lengthened.

Figure 3A:
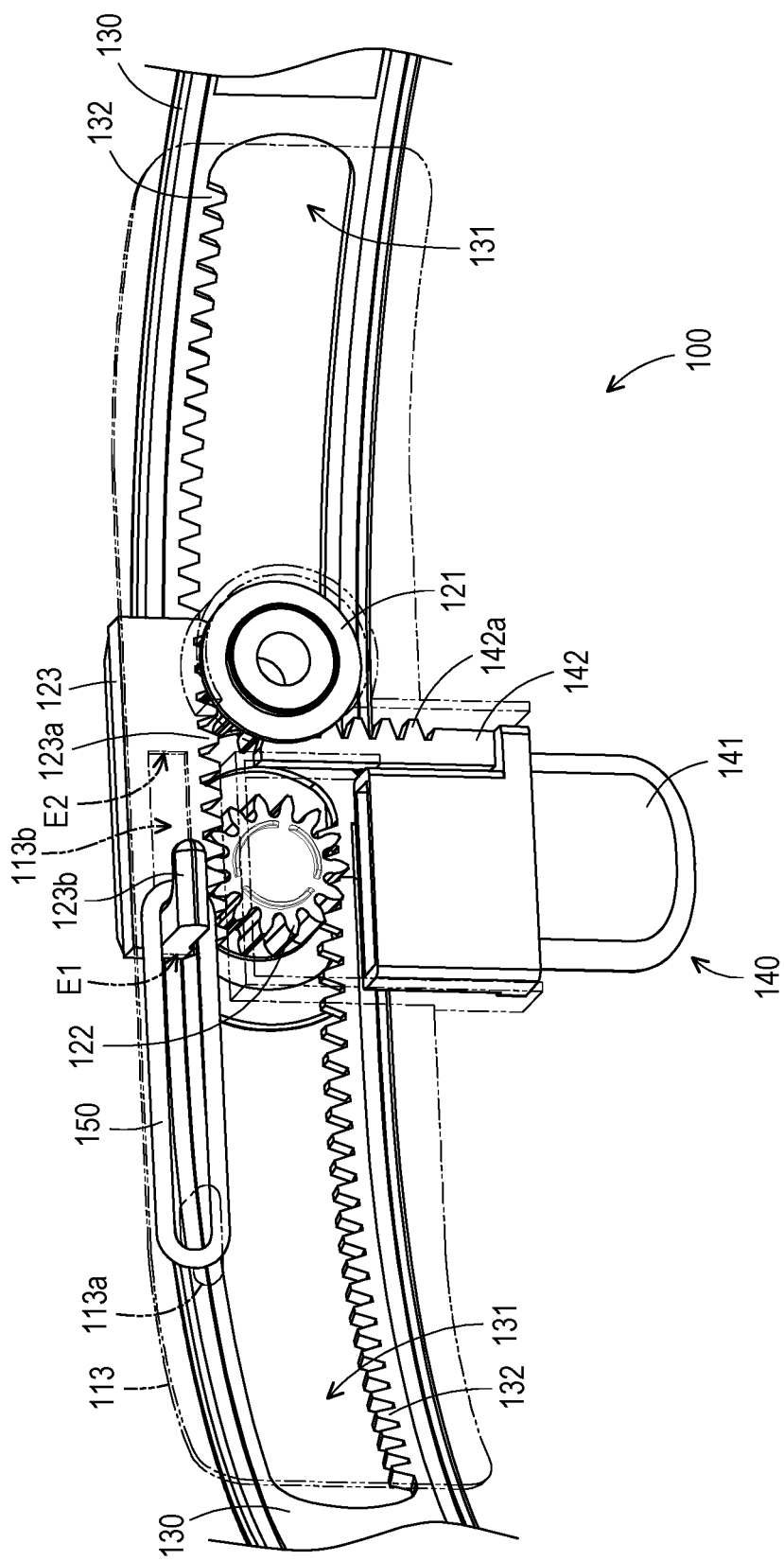
FIGS. 3A to 3E illustrate an adjustment process of the wearable assembly of FIG. 1A.
Figure 3B:
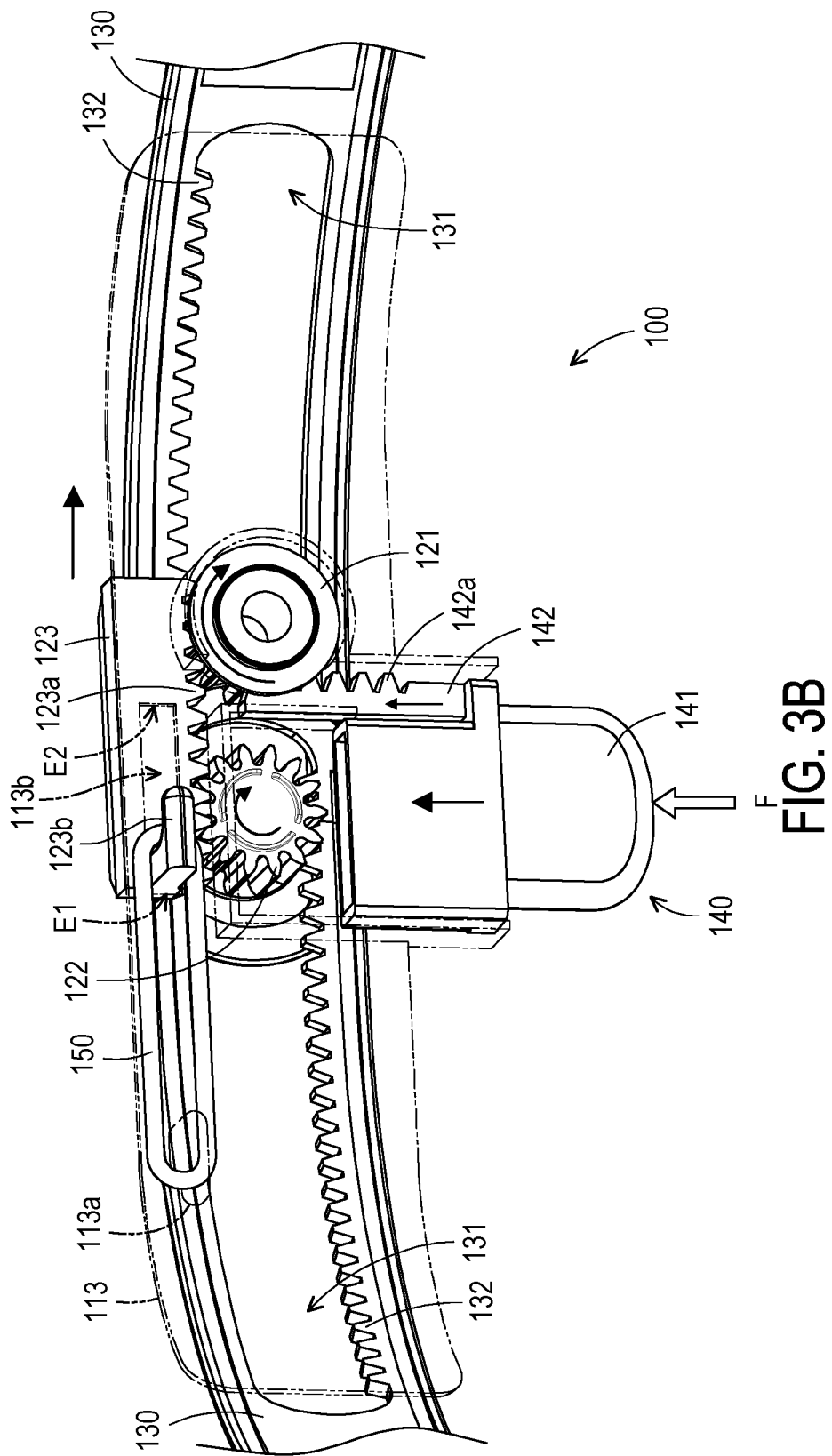
Figure 3C:
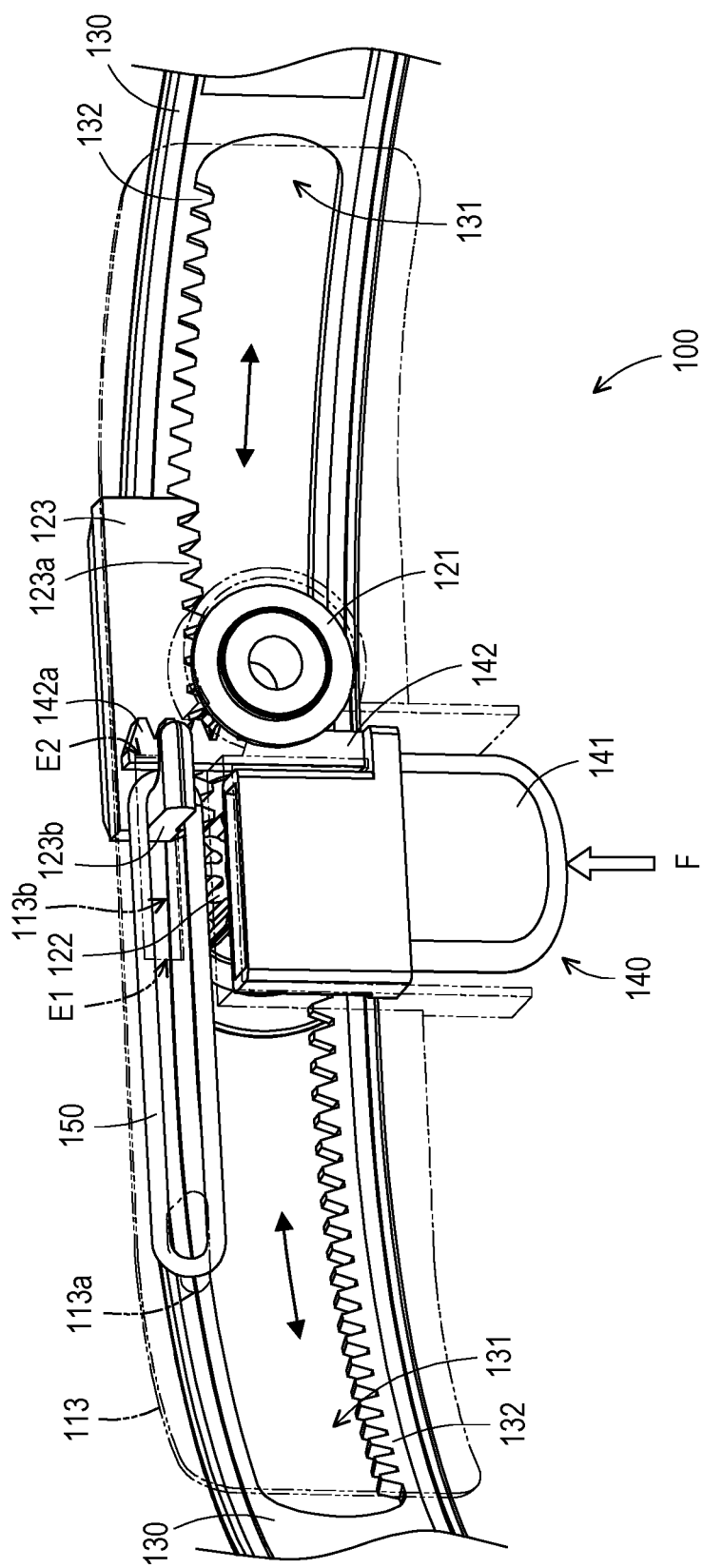
Figure 3D:
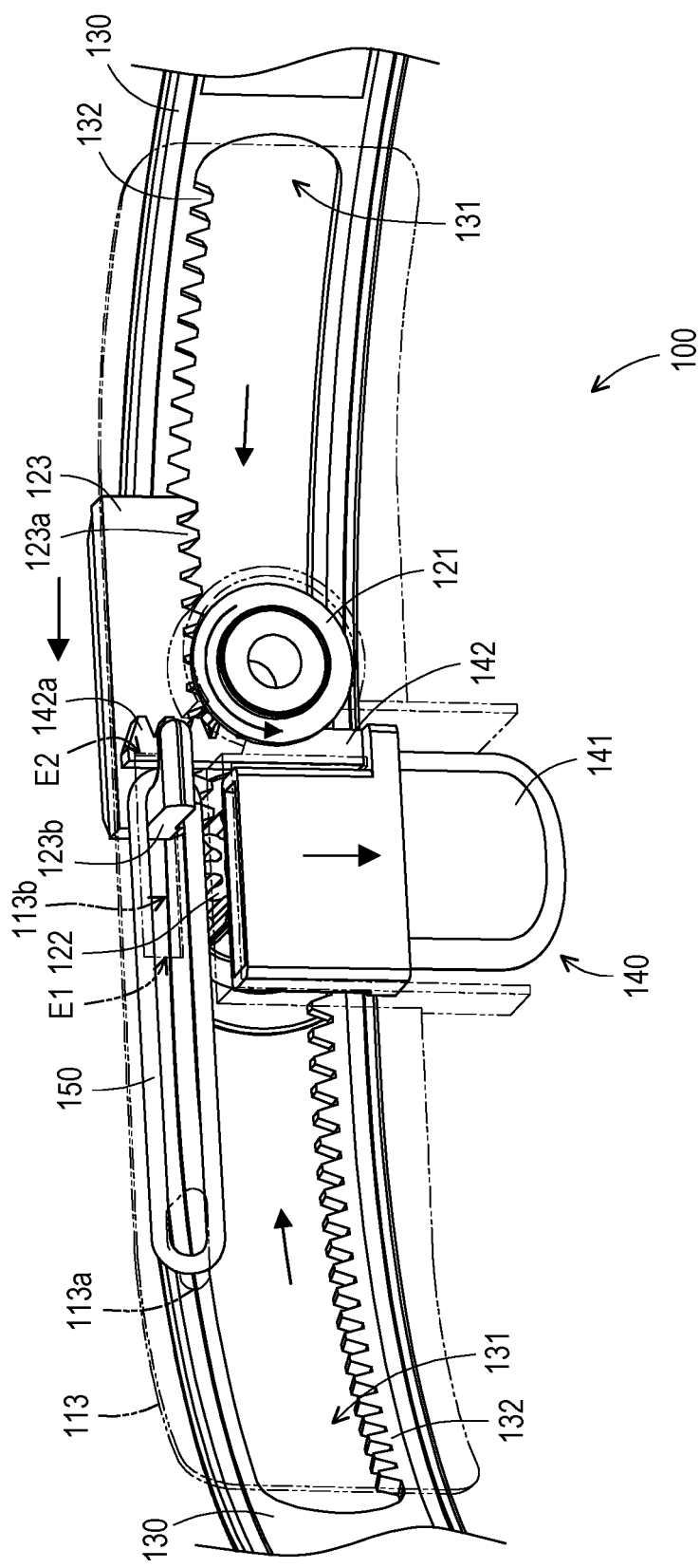
Figure 3E:
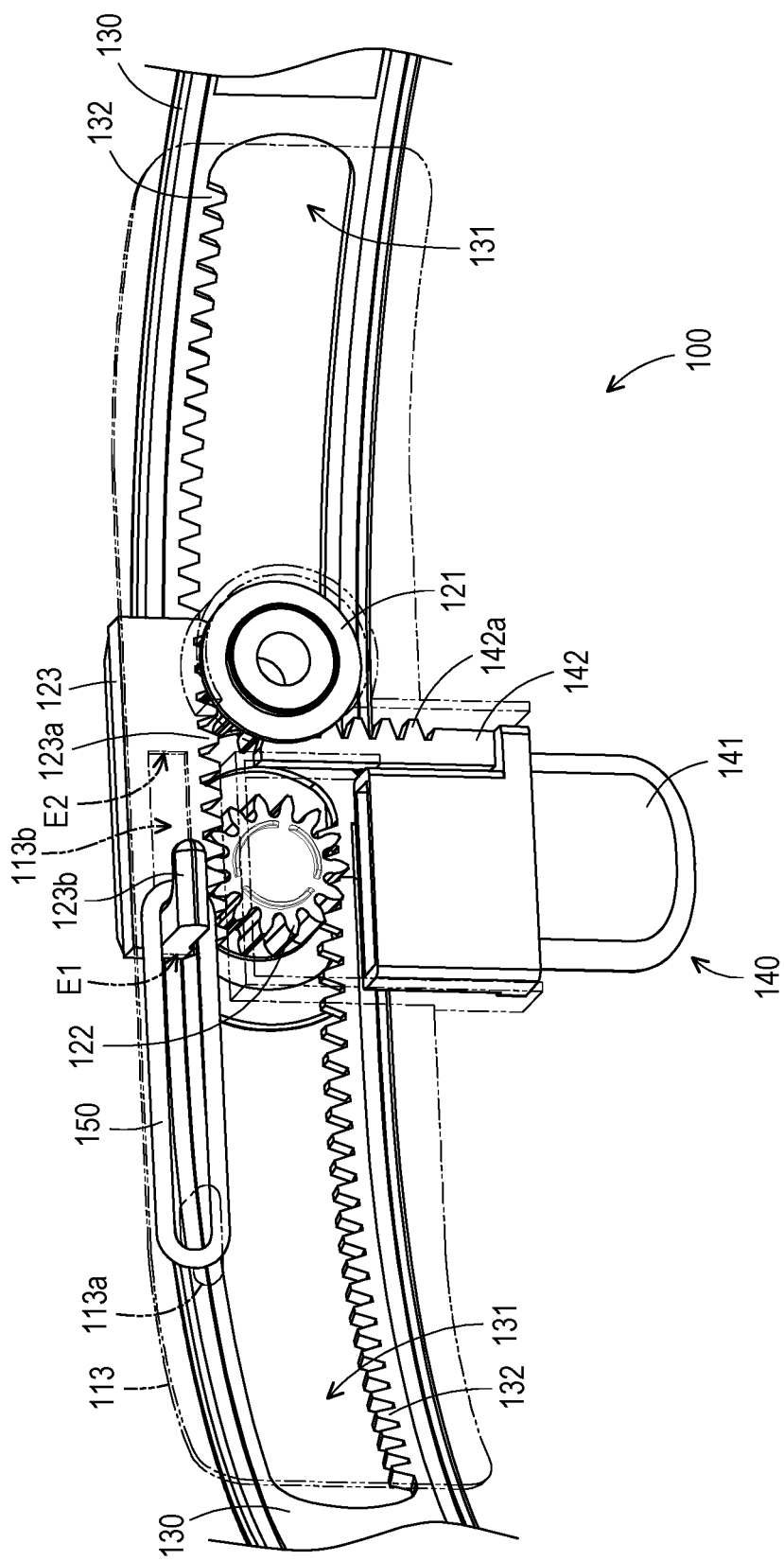
Figure 4A:
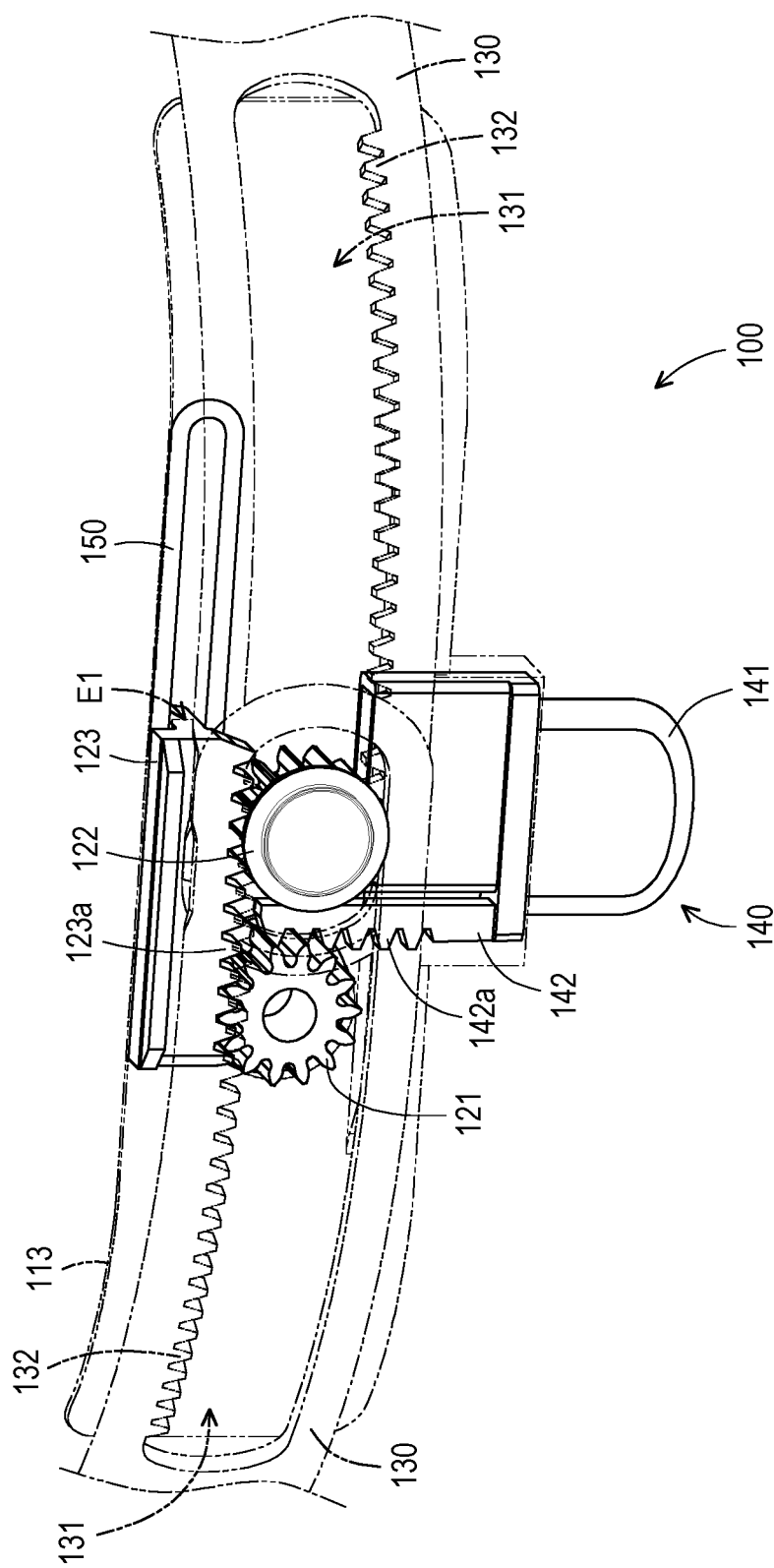
FIGS. 4A to 4E illustrate an adjustment process of the wearable assembly of FIG. 1A from another viewing angle.
Figure 4B:
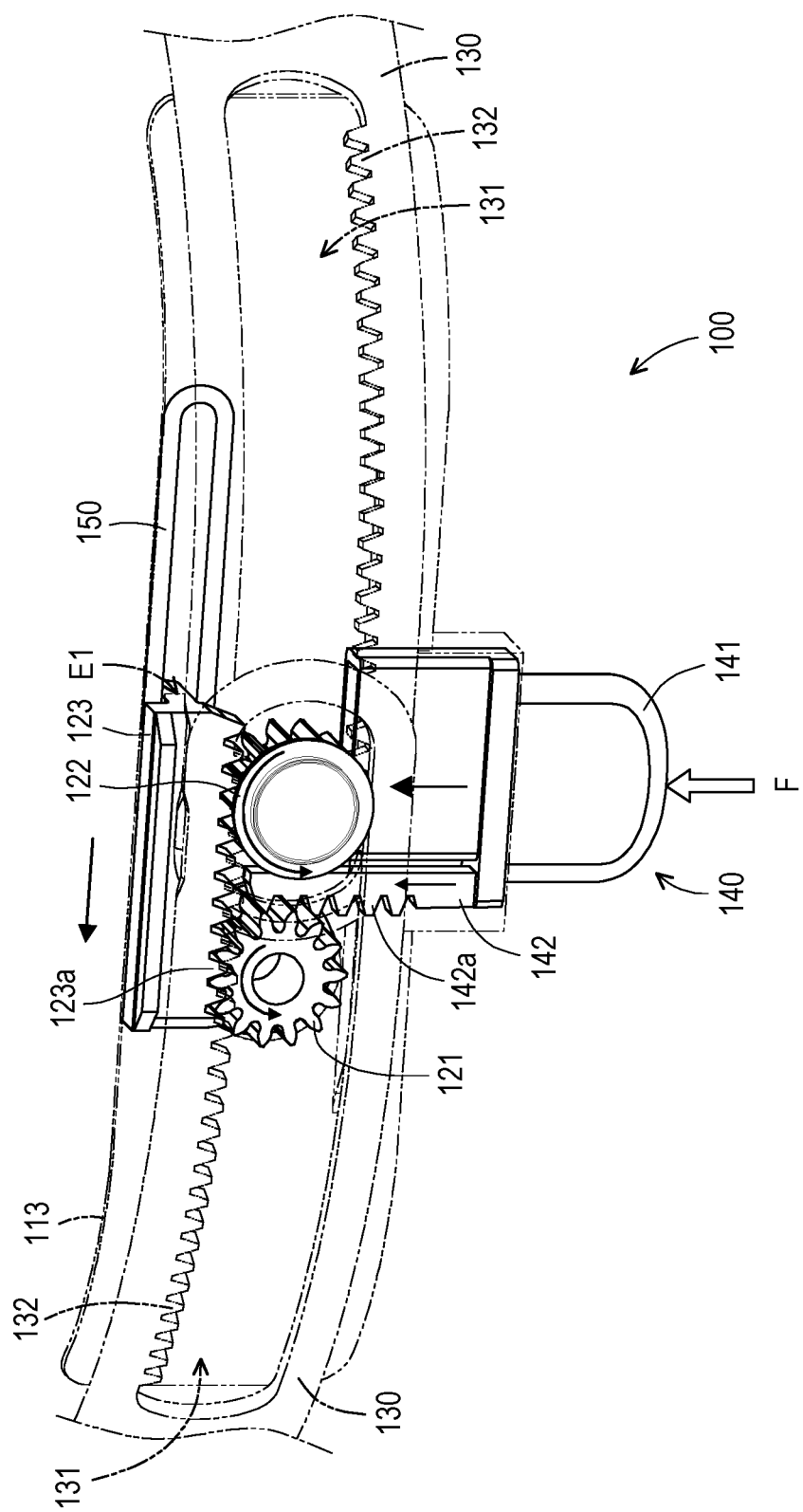
Figure 4C:
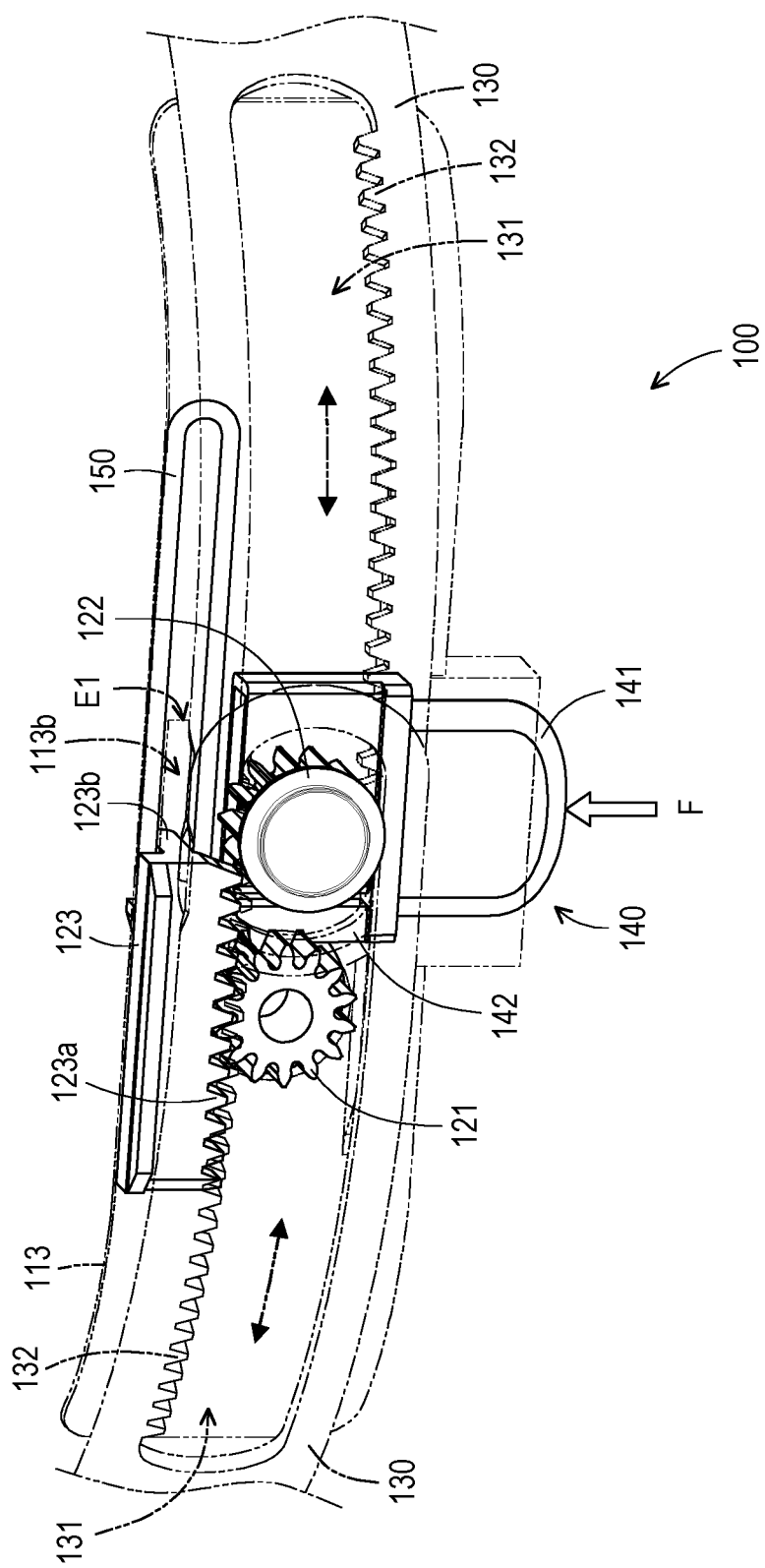
Figure 4D:
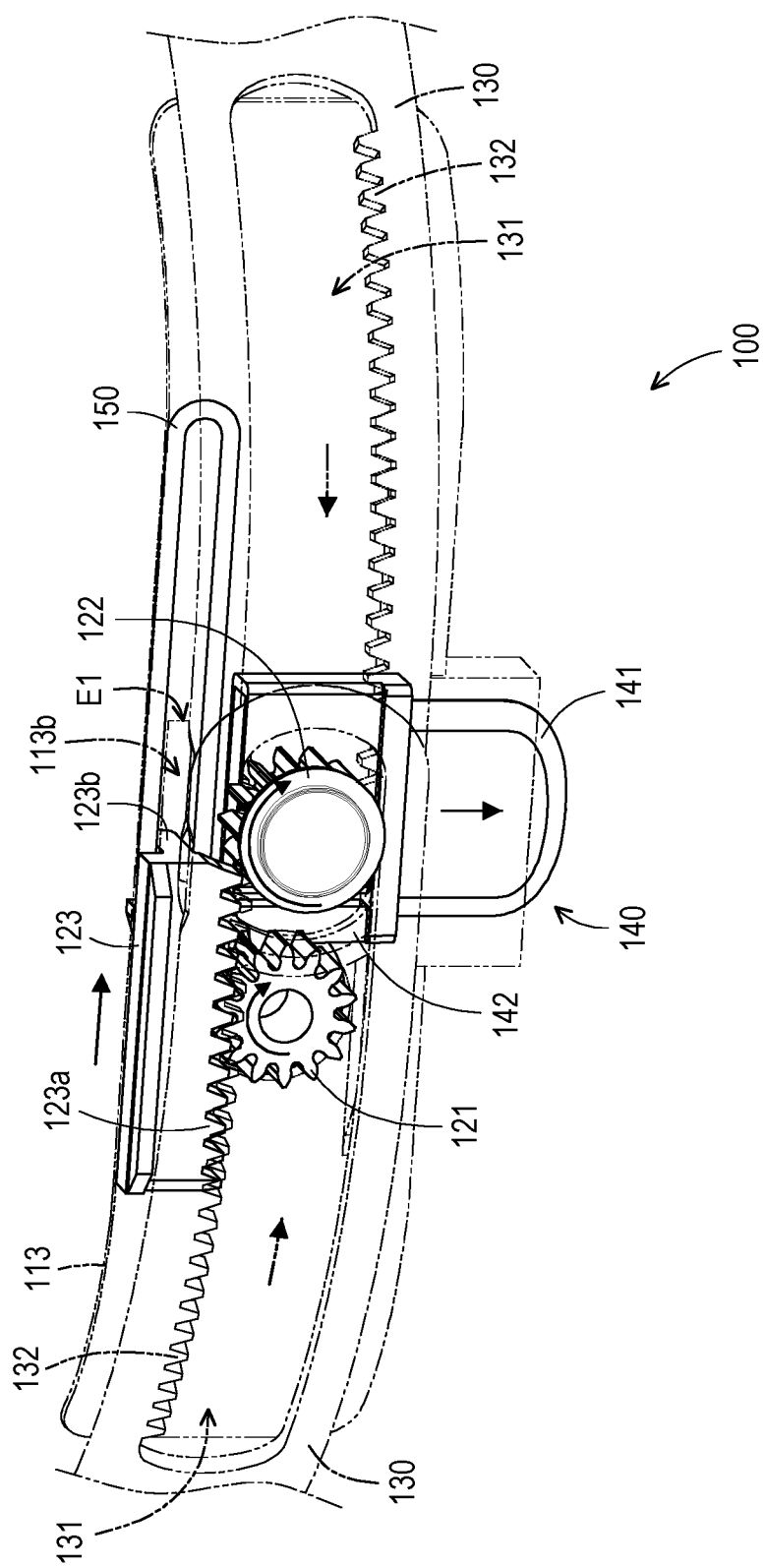
Figure 4E:
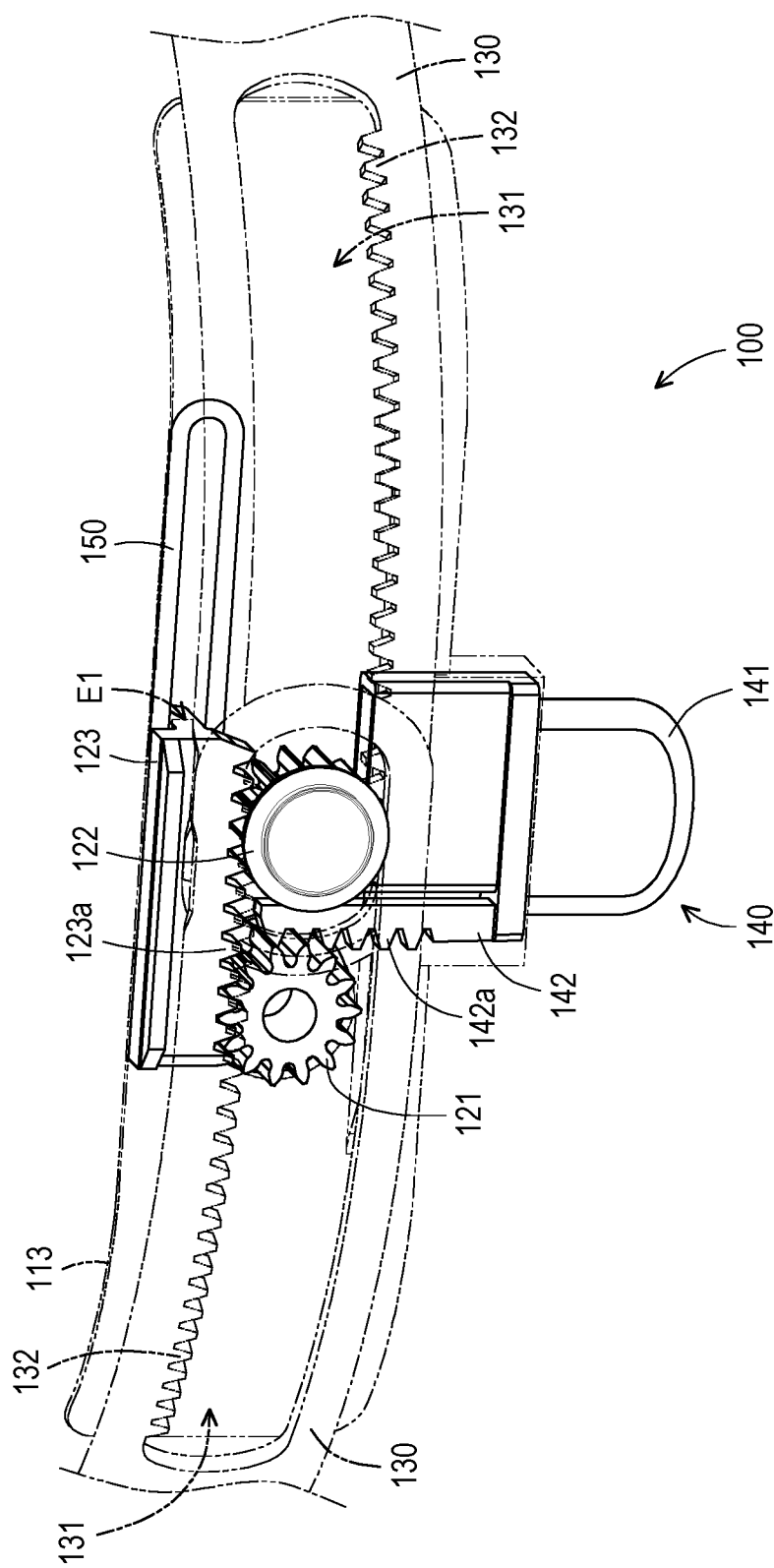

Referring to FIGS. 3A and 4A, when the button 140 is not pressed, the position returning member 150 exerts a restoring force to the moving member 123 so that the moving hook portion 123b abuts against the first end E1. In this state, the moving member 123 is fixed and cannot move relative to the cradle 110, so that the first rotating member 121 and the second rotating member 122 both engaging with the moving member 123 at the same time cannot rotate relative to the cradle 110. When the second rotating member 122 is fixed, the side headbands 130 engaging with the second rotating member 122 at the same time also cannot move relative to the cradle 110.

Referring to FIGS. 3B, 3C, 4B, and 4C, when the user presses the pressing portion 141 of the button 140, the pressing portion 141 receives an external force F to move relative to the cradle 110, so that the coupling portion 142 moves toward the direction of the first rotating member 121 along with the movement of the pressing portion 141, and drives the first rotating member 121 to rotate. When the pressing portion 141 abuts against the frame body 113 of the cradle 110 and stops moving, the coupling portion 142 also stops moving along with the pressing portion 141 and stops the rotation of the first rotating member 121.

Moreover, when the first rotating member 121 is rotated, the first rotating member 121 drives the moving member 123 to move away from the second rotating member 122. Specifically, when the pushing force exerted by the first rotating member 121 on the moving member 123 is greater than the restoring force exerted by the position returning member 150 on the moving member 123, the first rotating member 121 drives the moving member 123 to move relative to the cradle 110. At this time, the moving hook portion 123b moves from the first end E1 to the second end E2 along with the moving member 123 in the cradle slot 113b. When the moving hook portion 123b moves to the second end E2, the moving member 123 separates from the second rotating member 122. At this time, the second rotating member 122 does not engage with the moving member 123, so that the second rotating member 122 may freely rotate relative to the cradle 110.

As mentioned above, when the second rotating member 122 may freely rotate relative to the cradle 110, the side headbands 130 have a degree of freedom to be able to move relative to the cradle 110. At this time, the user may adjust the distance between the front assembly 11 and the cradle 110 by adjusting the length of each of the side headbands 130 exposed from the cradle 110. It should be noted that in this state, since the pressing portion 141 is continuously exerted with an external force F, causing the coupling portion 142 to be unable to move, the first rotating member 121 engaging with the button rack portion 142a cannot rotate relative to the cradle 110. Thus, the moving member 123 engaging with the first rotating member 121 is fixed, so as not to move toward the direction of the cradle hook portion 113a.

Referring to FIGS. 3D, 3E, 4D, and 4E, when the user releases the button 140, the external force F exerted to the pressing portion 141 is removed, so that the first rotating member 121 may freely rotate relative to the cradle 110. At this time, the moving member 123 only receives the restoring force exerted by the position returning member 150, so that the moving hook portion 123b moves from the second end E2 to the first end E1, and abuts against the first end E1.

Based on the above, when the moving member 123 moves from the second end E2 to the first end E1, the moving member 123 engages with the second rotating member 122 again. At this time, the moving member 123 receives the restoring force of the position returning member 150 to drive the second rotating member 122, so that the second rotating member 122 rotates relative to the cradle 110. When the second rotating member 122 rotates, the headband rack portions 132 engaging with the second rotating member 122 approach each other as the second rotating member 122 rotates, and drive the side headbands 130 to move toward each other, thereby slightly shortening the distance between the front assembly 11 and the cradle 110. Thus, the head-mounted display device 10 can further continuously get close to the user's head.

Moreover, when the moving member 123 moves from the second end E2 to the first end E1, the moving member 123 drives the first rotating member 121, so that the first rotating member 121 drives the coupling portion 142 to move toward the opening 112a of the cradle 110. At this time, the pressing portion 141 moves with the coupling portion 142 and returns to the initial position.

Specifically, the position returning member 150 may provide the restoring force to the moving member 123 so that the moving member 123 moves toward the first end E1. When no external force is exerted to the wearable assembly 100, the restoring force exerted by the position returning member 150 on the moving member 123 causes the moving member 123 to abut against the first end E1. At this time, the first rotating member 121 and the second rotating member 122 both engaging with the moving member 123 cannot rotate relative to the cradle 110, causing the side headbands 130 to be unable to move relative to each other. When an external force F is exerted to move the moving member 123 toward the second end E2, the moving member 123 separates from the second rotating member 122 so that the second rotating member 122 may freely rotate relative to the cradle 110, thereby enabling the side headbands 130 to have a degree of freedom to move relative to the cradle 110.

When the external force F is removed, the restoring force of the position returning member 150 causes the moving member 123 to move toward the direction of the cradle hook portion 113a, and the moving member 123 and the second rotating member 122 are re-engaged so that the second rotating member 122 rotates, thereby driving the side headbands 130 to move toward each other to further reduce the distance between the front assembly 11 and the cradle 110. That is, after pressing the button 140, the user may adjust the length of each of the side headbands 130 exposed from the cradle 110, so that the head-mounted display device 10 may be adjusted to fit the size of the user's head. After the user adjusts the side headbands 130 and releases the button 140, the side headbands 130 may be tightened through the coupling mechanism 120 by the restoring force of the position returning member 150 to continuously and slightly reduce the distance between the front assembly 11 and the cradle 110 to make the head-mounted display device 10 closer to the user's head.

Figure 5:
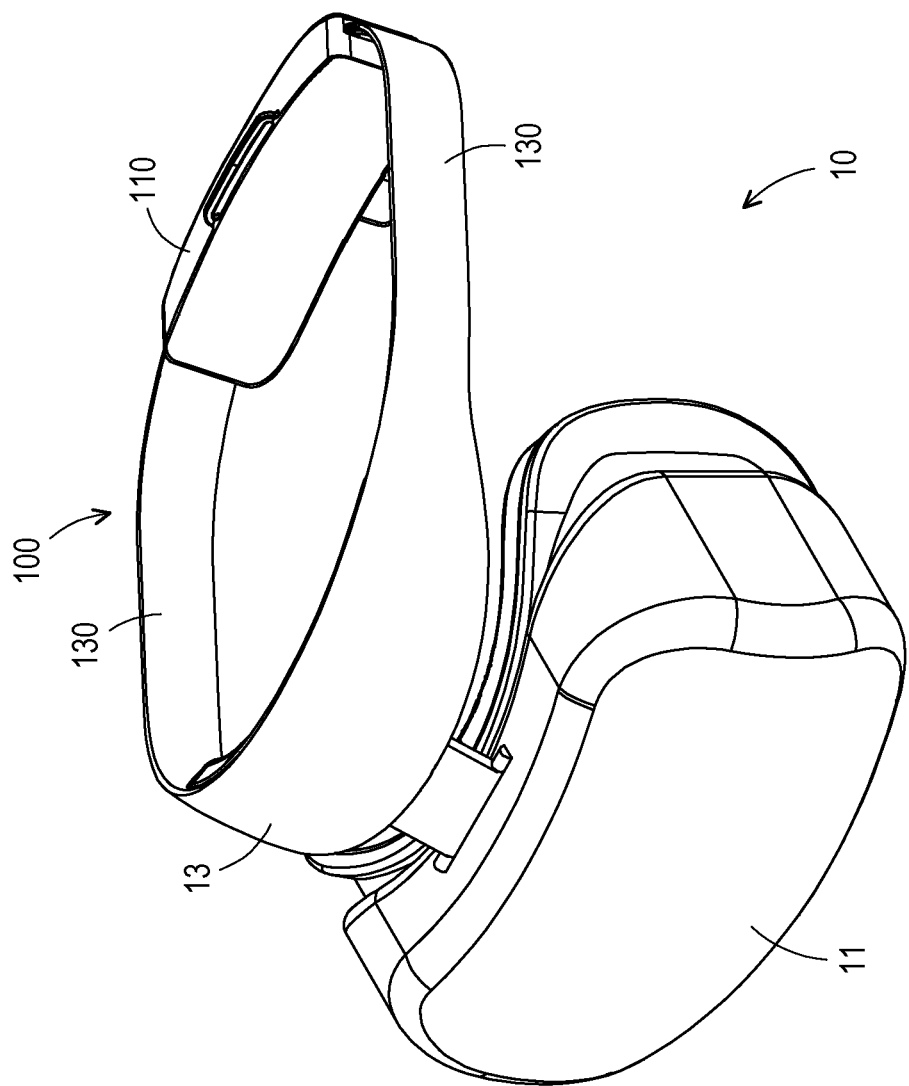
FIG. 5 is a schematic diagram of a head-mounted display device according to another embodiment of the invention.

Please refer to FIG. 5. Another embodiment shown in FIG. 5 is substantially the same as the embodiment of FIG. 1A. The difference between the two is as follows. In the embodiment of FIG. 1A, the side headbands 130 directly connect to the front assembly 11. In the embodiment, the head-mounted display device 10 may further include a front headband 13. The front headband 13 connects the wearable assembly 100 and the front assembly 11, and the front headband 13 may pivotally connect to the front assembly 11. Specifically, the front headband 13 may connect these side headbands 130. The front headband 13 may be integrally formed with the side headbands 130. When the side headbands 130 move relative to the cradle 110, the distance between the cradle 110 and the front headband 13 may be adjusted, and thus the distance between the cradle 110 and the front assembly 11 may be adjusted. In the embodiment of FIG. 5, the head-mounted display device 10 may also have an auxiliary headband 12 as shown in FIG. 1A, and the auxiliary headband 12 connects the cradle 110 and the front headband 13 to increase the stability of wearing the head-mounted display device 10 on the user's head.

In summary, in the disclosure, the head-mounted display device drives the coupling mechanism by pressing the button, so that the side headbands have a degree of freedom to move relative to the cradle. Thus, the distance between the cradle and the front assembly is adjusted so as to allow the user to quickly and conveniently adjust the wearing size of the head-mounted display device. In addition, when the button is released, the position returning member may tighten the side headbands through the coupling mechanism to continuously and slightly reduce the distance between the cradle and the front assembly, so that the head-mounted display device can further continuously get close to the user's head. Furthermore, the wearable assembly may also be detachably assembled to the front assembly, so the wearable assembly can be assembled to different types of front assemblies. Thus, the different types of front assemblies can all be close to the user's face. In other words, a head-mounted display device with such a wearable assembly can not only quickly adjust the side headbands to suit users with different head shapes, but also can fix the side headbands simply by releasing the button. Therefore, the head-mounted display device with such a wearable assembly not only has the advantage of being quickly put on and taken off, but also can be stably fixed on the user's head.

What is claimed is:

1. A head-mounted display device, comprising:
   a front assembly; and
   a wearable assembly, connected to the front assembly and adapted for wearing the front assembly to a face of a user, the wearable assembly comprising:
      a cradle;
      a plurality of side headbands, individually connected to the front assembly and inserted into the cradle;
      a button, movably connected to the cradle;
      a coupling mechanism, disposed in the cradle, which comprises:
         a moving member, movably connected to the cradle;
         a first rotating member, rotatably connected to the cradle and coupled to the moving member and the button; and
         a second rotating member, rotatably connected to the cradle and coupled to the moving member and the side headbands; and
      a position returning member, disposed between the cradle and the coupling mechanism, wherein
      when the button is pressed relative to the cradle, the button drives the coupling mechanism not to be coupled to the side headbands, so that the side headbands can move freely relative to the cradle to adjust lengths of the side headbands exposed from the cradle, and the button drive the first rotating member to rotate, the first rotating member drives the moving member to move and separate from the second rotating member, so that the side headbands can move freely relative to the cradle to adjust a length of each of the side headbands exposed from the cradle,
      when the button is released relative to the cradle, the position returning member drives the coupling mechanism to be coupled to the side headbands, and tighten the side headbands relative to the cradle through the coupling mechanism.

2. The head-mounted display device according to claim 1, wherein the button has a coupling portion, and the coupling portion is coupled to the first rotating member.

3. The head-mounted display device according to claim 2, wherein the coupling portion has a button rack portion, and the button rack portion engages with the first rotating member.

4. The head-mounted display device according to claim 1, wherein the moving member has a moving rack portion, the first rotating member and the second rotating member are gears, and the first rotating member and the second rotating member individually engage with the moving rack portion.

5. The head-mounted display device according to claim 1, wherein each of the side headbands has a headband slot and a headband rack portion, each of the headband rack portions is located in the corresponding headband slot, the second rotating member is a gear, and the second rotating member is located in the headband slots and engages with the headband rack portions.

6. The head-mounted display device according to claim 1, wherein the cradle has a cradle hook portion, the moving member has a moving hook portion, the position returning member is an elastic ring, and both ends of the position returning member are hooked with the cradle hook portion and the moving hook portion, respectively.

7. The head-mounted display device according to claim 1, further comprising:
   a front headband, connected to the front assembly, wherein each of the side headbands is connected to the front headband, so as to be connected to the front assembly through the front headband.

8. The head-mounted display device according to claim 7, wherein the front headband is pivotally connected to the front assembly.

9. A wearable assembly, adapted to be connected to a front assembly of a head-mounted display device and adapted for wearing the front assembly to a face of a user, the wearable assembly comprising:
   a cradle;
   a plurality of side headbands, individually connected to the front assembly and inserted into the cradle;
   a button, movably connected to the cradle;
   a coupling mechanism, disposed in the cradle, which comprises:
      a moving member, movably connected to the cradle;
      a first rotating member, rotatably connected to the cradle and coupled to the moving member and the button; and
      a second rotating member, rotatably connected to the cradle and coupled to the moving member and the side headbands; and
   a position returning member, disposed between the cradle and the coupling mechanism, wherein
   when the button is pressed relative to the cradle, the button drives the coupling mechanism not to be coupled to the side headbands, so that the side headbands can move freely relative to the cradle to adjust a distance between the cradle and the front assembly, and the button drive the first rotating member to rotate, the first rotating member drives the moving member to move and separate from the second rotating member, so that the side headbands can move freely relative to the cradle to adjust a length of each of the side headbands exposed from the cradle,
   when the button is released relative to the cradle, the position returning member drives the coupling mechanism to be coupled to the side headbands, and tighten the side headbands relative to the cradle through the coupling mechanism.

10. The wearable assembly according to claim 9, wherein the button has a coupling portion, and the coupling portion is coupled to the first rotating member.

11. The wearable assembly according to claim 10, wherein the coupling portion has a button rack portion, and the button rack portion engages with the first rotating member.

12. The wearable assembly according to claim 9, wherein the moving member has a moving rack portion, the first rotating member and the second rotating member are gears, and the first rotating member and the second rotating member individually engage with the moving rack portion.

13. The wearable assembly according to claim 9, wherein each of the side headbands has a headband slot and a headband rack portion, each of the headband rack portions is located in the corresponding headband slot, the second rotating member is a gear, and the second rotating member is located in the headband slots and engages with the headband rack portions.

14. The wearable assembly according to claim 9, wherein the cradle has a cradle hook portion, the moving member has a moving hook portion, the position returning member is an elastic ring, and both ends of the position returning member are hooked with the cradle hook portion and the moving hook portion, respectively.

15. The wearable assembly according to claim 9, further comprising:
   a front headband, connected to the front assembly, wherein each of the side headbands is connected to the front headband, so as to be connected to the front assembly through the front headband.

16. The wearable assembly according to claim 15, wherein the front headband is pivotally connected to the front assembly.

* * * * *